United States Patent [19]
van de Hazel

[11] Patent Number: 5,807,055
[45] Date of Patent: Sep. 15, 1998

[54] APPARATUS FOR LOADING AND/OR UNLOADING A CONTAINER WITH STACKS OF PACKAGES, SUCH AS FOR INSTANCE EGG TRAYS

[75] Inventor: Brand van de Hazel, Putten, Netherlands

[73] Assignee: FPS Food Processing Systems B.V., Netherlands

[21] Appl. No.: 681,334

[22] Filed: Jul. 23, 1996

[30] Foreign Application Priority Data

Jul. 24, 1995 [NL] Netherlands ............................ 1000879

[51] Int. Cl.$^6$ ...................................................... B65G 1/06
[52] U.S. Cl. ........................................ 414/331; 198/347.1
[58] Field of Search .............................. 198/347.1, 347.3, 198/368, 502, 601; 414/285, 331

[56] References Cited

U.S. PATENT DOCUMENTS

| | | | |
|---|---|---|---|
| 3,071,266 | 1/1963 | Pries et al. | |
| 3,511,357 | 5/1970 | Vanderhoof | 198/601 |
| 4,166,525 | 9/1979 | Bruno | 198/601 |
| 4,188,861 | 2/1980 | Kroeze et al. | 198/592 |
| 4,230,216 | 10/1980 | Wiens | 198/347.3 |
| 4,284,187 | 8/1981 | Kramer et al. | 198/592 |
| 5,205,393 | 4/1993 | Malow et al. | 198/592 |
| 5,337,880 | 8/1994 | Claycomb et al. | 198/347.3 |

FOREIGN PATENT DOCUMENTS

| | | |
|---|---|---|
| 0534558 A1 | 3/1993 | European Pat. Off. |
| 0534558 B1 | 7/1993 | European Pat. Off. |
| 0550919 | 7/1993 | European Pat. Off. |
| 1243245 | 8/1960 | France |
| 2665150 | 1/1992 | France |
| 2051722 | 1/1981 | United Kingdom |

Primary Examiner—Karen M. Young
Assistant Examiner—Gregory A. Morse
Attorney, Agent, or Firm—Larson & Taylor

[57] ABSTRACT

Apparatus for loading and/or unloading a container with stacks of packages, such as for instance egg boxes or egg trays, which container comprises a number of shelves which are arranged one above the other. The apparatus includes a collecting table, a sliding device for sliding the stacks of packages on the container shelf, and a transfer device for the transfer of the stacks of packages between the collecting table and one end of a further conveyor. The collecting table includes an endless collecting table conveyor and the transfer device includes an endless conveyor assembly.

27 Claims, 4 Drawing Sheets

APPARATUS FOR LOADING AND/OR UNLOADING A CONTAINER WITH STACKS OF PACKAGES, SUCH AS FOR INSTANCE EGG TRAYS

FIELD OF THE INVENTION

The invention relates to an apparatus for loading and/or unloading a container with stacks of packages, such as egg trays, where the container has a number of shelves arranged one above the other and supported by a frame

BACKGROUND OF THE INVENTION

Such an apparatus is known from European patent Ep-B-0 534 558.

The known loading and/or unloading apparatuses have as their major problem that the processing capacity thereof is too low. With the conventional containers suitable for the storage of egg trays, wherein six stacks of egg trays are stored on each container shelf, a capacity of about 60,000 eggs per hour is achieved. Because the other egg-processing apparatuses generally have a much higher capacity, the known apparatuses for loading and/or unloading such a container constitute the bottleneck in the machinery.

Another problem of the known apparatus is formed in that the sometimes wet or moist egg trays are damaged when sliding from a container shelf onto the collecting table and vice versa.

Further, despite the fact that the height adjustment of the collecting table is controlled on the basis of the height of the container shelves, it may still occur that the collecting table is locally located slightly above or below the container shelf, for instance because the container shelf is not completely flat and the height measurement for positioning the collecting table took place at a lower part of the container shelf. Under these conditions, when the egg trays are being slid from the container shelf onto the collecting table or during the reverse operation, the bottoms of these trays may bump against the edge of the collecting table or the container shelf respectively, and thus be damaged.

SUMMARY OF THE INVENTION

The object of the invention is to improve an apparatus for loading and/or unloading of the type set forth above in such a manner that the above-described problems have been solved.

To this end, the apparatus is provided with a collecting table which supports at least one stack of packages, a moving means for moving the collecting table in a vertical direction and hence to the level of different shelves, a sliding means for sliding the stacks on the container shelves, and a transfer means for transferring the stacks between the collecting table and a further conveyor.

Because the collecting table comprises an endless collecting table conveyor, at least on the collecting table the displacement of the stacks of packages no longer involves any friction. After all, the bottom of the lowermost package of the stack is stationary relative to the moving table surface. As soon as a stack of packages has been slightly slid onto the collecting table by the sliding means, the collecting table conveyor takes over the conveyance of the stack, so that, moreover, the pressure that is to be exerted on a following stack of packages from a row of stacks to be transferred decreases through the fact that the friction experienced by the row of stacks decreases as soon as the conveyance of a preceding stack from the row of stacks is provided by the collecting table conveyor.

Also, because the first end of the collecting table conveyor is bounded by a reversing roller, the height adjustment of the collecting table relative to the container shelf is no longer so critical. After all, if the collecting table is located slightly above the container shelf, a stack coming from a container shelf and running against the reversing roller will still be taken along without being damaged, because of the conveying movement of the collecting table conveyor.

However, the major advantage of the apparatus according to the invention is formed by the greater capacity thereof. With a container as described hereinabove, which is suitable for storing six stacks of egg trays per container shelf, a capacity of about 120,000 eggs per hour can be achieved. This increase of capacity is realized in particular because the apparatus comprises an endless conveyor assembly which is displaceable in vertical direction independently of the collecting table. In the case of an unloading apparatus, it applies that as soon as the conveyor assembly has been filled with a particular number of stacks of packages and the collecting table is empty, the conveyor assembly can be moved to the level of the further conveyor while the collecting table can be moved to a next container shelf for receiving, at that location, a new series of stacks. In the case of a loading apparatus, it applies that as soon as the conveyor assembly has been filled with a particular number of stacks of packages and the collecting table conveyor is empty, the conveyor assembly can be moved to the collecting table conveyor or vice versa and the stacks can be transferred from the conveyor assembly onto the collecting table conveyor. As soon as this transfer has taken place, the assembly can receive stacks again from the further conveyor while at the same time, the collecting table conveyor can transfer the newly received stacks onto a conveyor shelf. With the known loading and unloading apparatuses, the collecting table was emptied on or filled by the further conveyor and during this emptying or filling operation, no stack of packages could be transferred between the container and the collecting table. In accordance with the invention, the transfer of stacks from or to the further conveyor and the transfer of stacks between a container shelf and the collecting table can be carried out simultaneously, which has resulted in a capacity doubling.

BRIEF DESCRIPTION OF THE DRAWINGS

Further elaborations of the invention are described hereafter which will be specified on the basis of two exemplary embodiments, with reference to the accompanying drawings, wherein.

DESCRIPTION OF THE PREFERRED EMBODIMENTS

The two exemplary embodiments are intended for the transfer of stacks of packages between a container 1, comprising a number of shelves 2 which are arranged one above the other and supported by a frame 3, and a further conveyor 10, which either supplies or discharges stacks of packages S.

The apparatus is provided with a collecting table 4 having an endless collecting table conveyor 11 and with means 5 for moving the collecting table 4 in vertical direction to the level of the different shelves 2 of the container 1. These means 5 can for instance be designed as an electric motor driving a chain wheel over which a chain passes from which the collecting table 4 is suspended. The two exemplary embodiments further comprise sliding means 6, 14, 16 for sliding the stacks of packages S on the container shelf 2. These sliding means 6, 14, 16, too, are displaceable in vertical direction relative to the container 1. For this purpose, the sliding means are connected to a frame 23 which is guided in vertical direction along standards 24, the vertical displacement of the frame being effected by an electric motor 18 driving two chain wheels over which chains pass from which the frame 23 is suspended.

Because the vertical standards of the frame 3, which are located at the corner points of the container, are formed by L-shaped angle sections, the stacks of packages S, during the positioning or removal thereof, should first be shifted in a first direction over the container shelf 2 and then in a second direction. This is necessary for enabling the stacks of packages S to be accurately positioned in a corner or removed therefrom.

The two exemplary embodiments further comprise transfer means 7, 8, 9 for transferring stacks of packages S between the collecting table 4 and one end 10a of the further conveyor 10. The transfer means 7, 8, 9 comprise an endless conveyor assembly 7, 8, 9, displaceable in vertical direction independently of the collecting table 4. This conveyor assembly 7, 8, 9, too, is adjustable in vertical direction by means of, for instance, an electric motor 17 driving a chain wheel over which a chain passes from which the assembly 7, 8, 9 is suspended. Both the collecting table 4 and the endless conveyor assembly 7, 8, 9 are guided in vertical direction by associated standards 19 and 20 respectively. For this purpose, both the collecting table 4 and the conveyor assembly 7, 8, 9 are provided with frames 21 and 22 respectively, displaceable in vertical direction along the standards 19, 20 via guide wheels. The chains cooperating with the electromotors 5 and 17 respectively, by means of which chains the collecting table 4 and the conveyor assembly 7, 8, 9 are moved up and down, have one end connected to these respective frames 21, 22.

By means of an apparatus of such design, a first end 7a, 8a of the endless conveyor assembly 7, 8, 9 can be connected to the second end 11b of the collecting table conveyor 11 through vertical displacement of the assembly 7, 8, 9 relative to the collecting table conveyor 11. Moreover, a second end 9b of the endless conveyor assembly 7, 8, 9 can be connected to the end 10a of the further conveyor 10 through vertical displacement of the assembly 7, 8, 9. Preferably, the collecting table conveyor 11 is adapted to simultaneously receive or dispense at least two juxtaposed stacks of packages S, viewed in width direction of the collecting table conveyor 11. In this respect, the endless conveyor assembly 7, 8, 9 should preferably comprise two endless first conveyors 7, 8, drivable independently of each other and extending next to each other, the first ends 7a, 8a of which are connectable to the second end 11b of the collecting table conveyor 11 and the second ends 7b, 8b of which each connect to a first end 9a of a single, endless, second conveyor 9, of which second conveyor 9 a second end 9b can be connected to the end 10a of the further conveyor 10 through vertical displacement of the conveyor assembly 7, 8, 9.

In order to provide the loading or unloading apparatus with a high processing speed, it is particularly favorable if the conveying direction of the endless collecting table conveyor 11, the or each endless conveyor 7, 8, 9 of the conveyor assembly 7, 8, 9, and the further conveyor 10 corresponds to the direction in which the sliding means 6 transfer the stacks of packages between the container shelf 2 and the first end 11a of the collecting table conveyor 11. After all, if this is the case, the stacks of packages S need to undergo a minimal number of changes of direction during their conveyance, which improves the processing speed of the apparatus to a considerable extent.

With the conventional containers for storing stacks of packages, such as for instance egg trays, the container shelves 2 typically have an edge which is bent over downwards. This bent-over edge limits the height of the feed opening through which the stacks of packages S are to be slid onto the subjacent container shelf 2. In order to temporarily increase the height of the feed opening, the apparatus according to the invention comprises means 13 for temporarily lifting a side, facing the collecting table 4, of a container shelf 2 located above the container shelf 2 which is being loaded or unloaded. These means are constructed as a hook 13 which is controllable in vertical direction and connected to the frame 21 supporting the collecting table 4.

Figure 1:
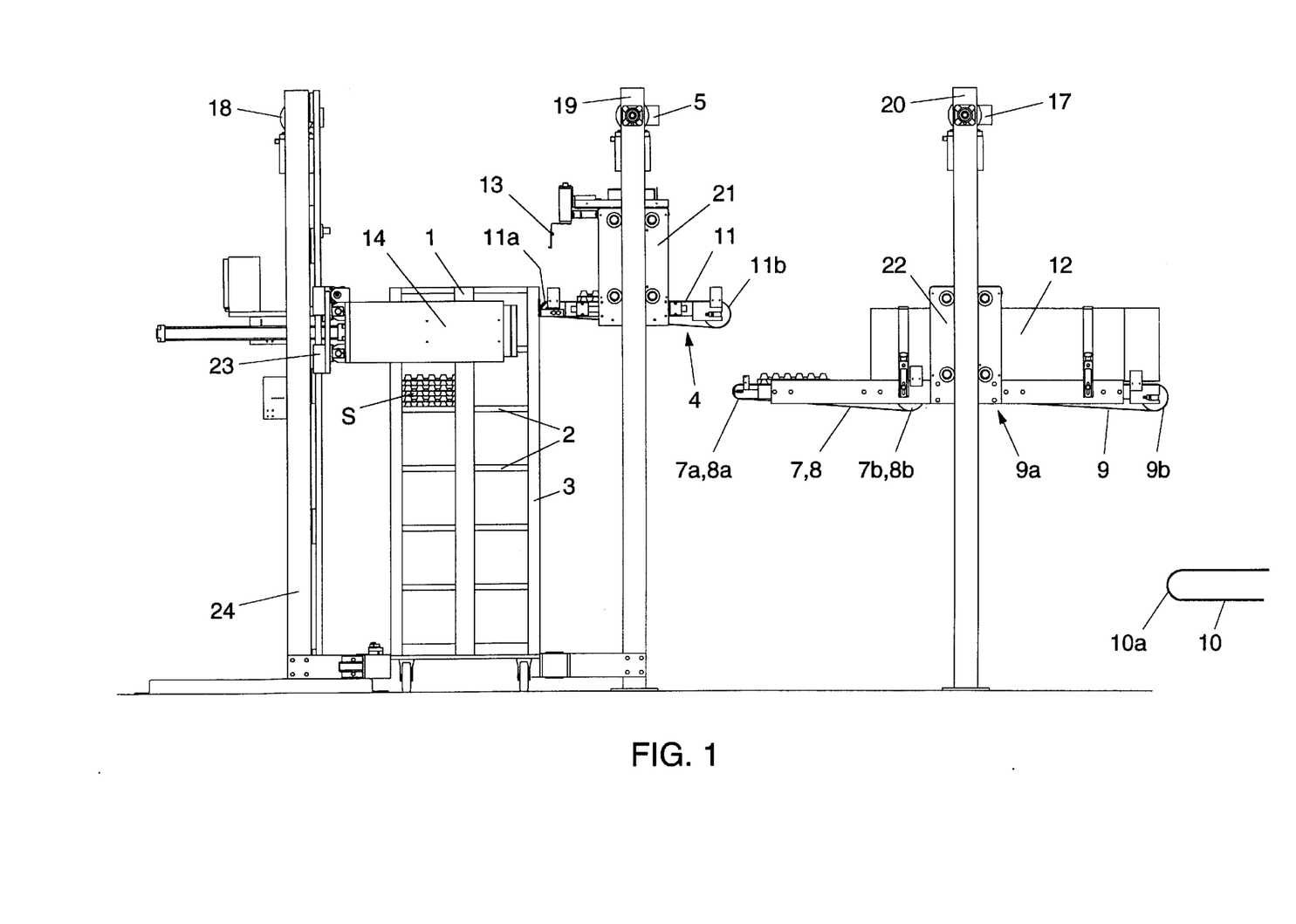
FIG. 1 is a side elevation of an exemplary embodiment of an unloading apparatus.
Figure 2:
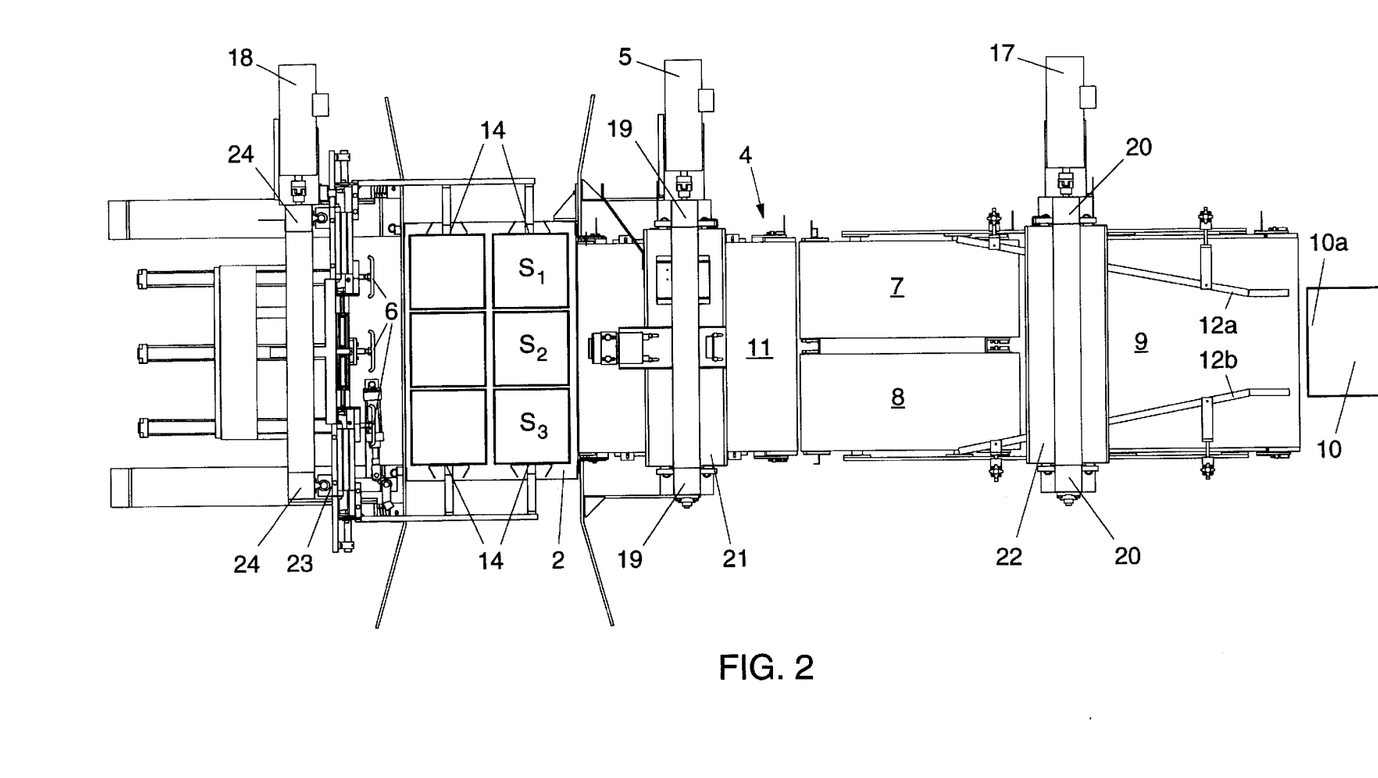
FIG. 2 is a top plan view of the exemplary embodiment shown in FIG. 1.

The first exemplary embodiment, shown in FIGS. 1 and 2, is an unloading apparatus having means 12, disposed above the conveying surface of the second conveyor 9, for displacing eccentrically fed stacks of packages S to the center of the second conveyor 9. These means are constructed as two guiding elements 12a, 12b disposed in the manner of a funnel, whose mutual distance, viewed in the conveying direction from the first end 9a to the second end 9b of the second conveyor 9, decreases. Preferably, the distance between the guiding elements 12a, 12b at the first end 9a of the second conveyor is at least as large as or larger than twice the width of the stacks of packages S to be processed, while this distance at the second end 9b of the second conveyor 9 is smaller than twice the width of the stacks of packages S to be processed but larger than once the width of such a stack S.

The exemplary embodiment shown of the unloading apparatus is an apparatus which is suitable for unloading containers capable of receiving per shelf 2 six stacks of packages S, which stacks S are positioned next to each other in three rows S1, S2, S3 extending in the conveying direction of the collecting table conveyor 11. The apparatus comprises a control designed so that during unloading, the following steps are passed through:

First, the collecting table conveyor 11 moves to the level of a container shelf 2. Then, the sliding means 6, which have likewise moved to the level of the container shelf 2, first slide the central row S2 of the three rows onto the collecting table conveyor 11. Then, with the sliding means 14, the two outer rows of stacks S1, S3 are slid against each other and positioned substantially at the center of the container shelf 2. Meanwhile, the endless conveyor assembly 7, 8, 9 has moved to the level of the collecting table conveyor 11, or, if this is not yet the case, the assembly 7, 8, 9 is moved to the level of the collecting table conveyor 11. Then, the sliding means 6 slide the outer two rows of stacks S1, S3 onto the collecting table conveyor 11, while simultaneously, the row of stacks S2 which is already located on the collecting table conveyor 11 is conveyed onto the endless conveyor assembly 7, 8, 9. Both the collecting table conveyor 11 and the or each conveyor 7, 8, 9 of the endless conveyor assembly 7, 8, 9 are driven for such a period that all rows of stacks S1, S2, S3 are located on the endless conveyor assembly 7, 8, 9. After this, the collecting table conveyor 11 and the sliding means 6, 14 can be moved to a following container shelf 2 and the collecting table conveyor 11 can receive a following row of stacks S2 of packages, while at the same time, the endless conveyor assembly 7, 8, 9 can be moved to the level of the further conveyor 10 for successively transferring onto it the rows of stacks of packages S1, S2, S3 located on the endless conveyor assembly 7, 8, 9. For this purpose, the second conveyor 9 is driven first, while at the same time, one of the first conveyors 7, 8 is driven, so that the first row of stacks S2 is transferred to the further conveyor 10, while at the same time the second row of stacks S1 is transferred from one first conveyor 7 onto the second conveyor 9. When the second row of stacks S1 is entirely located on the second conveyor 9, the other first conveyor 8 can be switched on so that, next, the third row of stacks S3 is transferred from the other first conveyor 8 onto the further conveyor 10 via the second conveyor 9.

It is further noted that with this apparatus, it is particularly favorable if the conveying speed of the collecting table conveyor 11 is at least as great as the speed of movement of the sliding means 6. It is thus provided that the first stack of a row of stacks to be slid onto the collecting table conveyor 11 is slightly pulled away from the following stack of the row. This considerably reduces the force that is to be exerted by the sliding means 6 on the row of stacks for the transfer thereof. After all, the friction experienced by the preceding stack of the row through the container shelf 2 drops out as soon as the conveyance of this foremost stack is provided by the collecting table conveyor 11.

Figure 3:
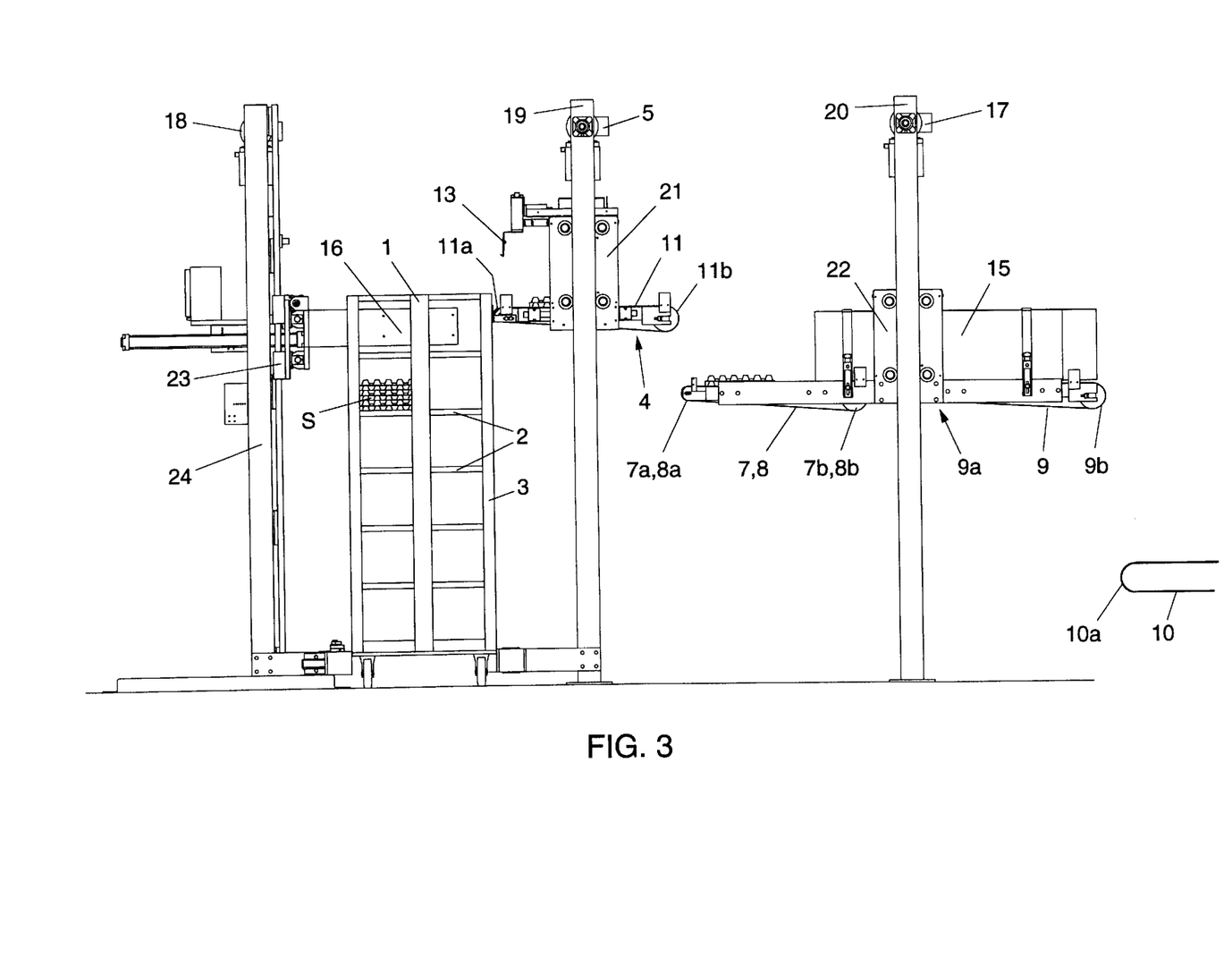
FIG. 3 is a side elevation of an exemplary embodiment of a loading apparatus.
Figure 4:
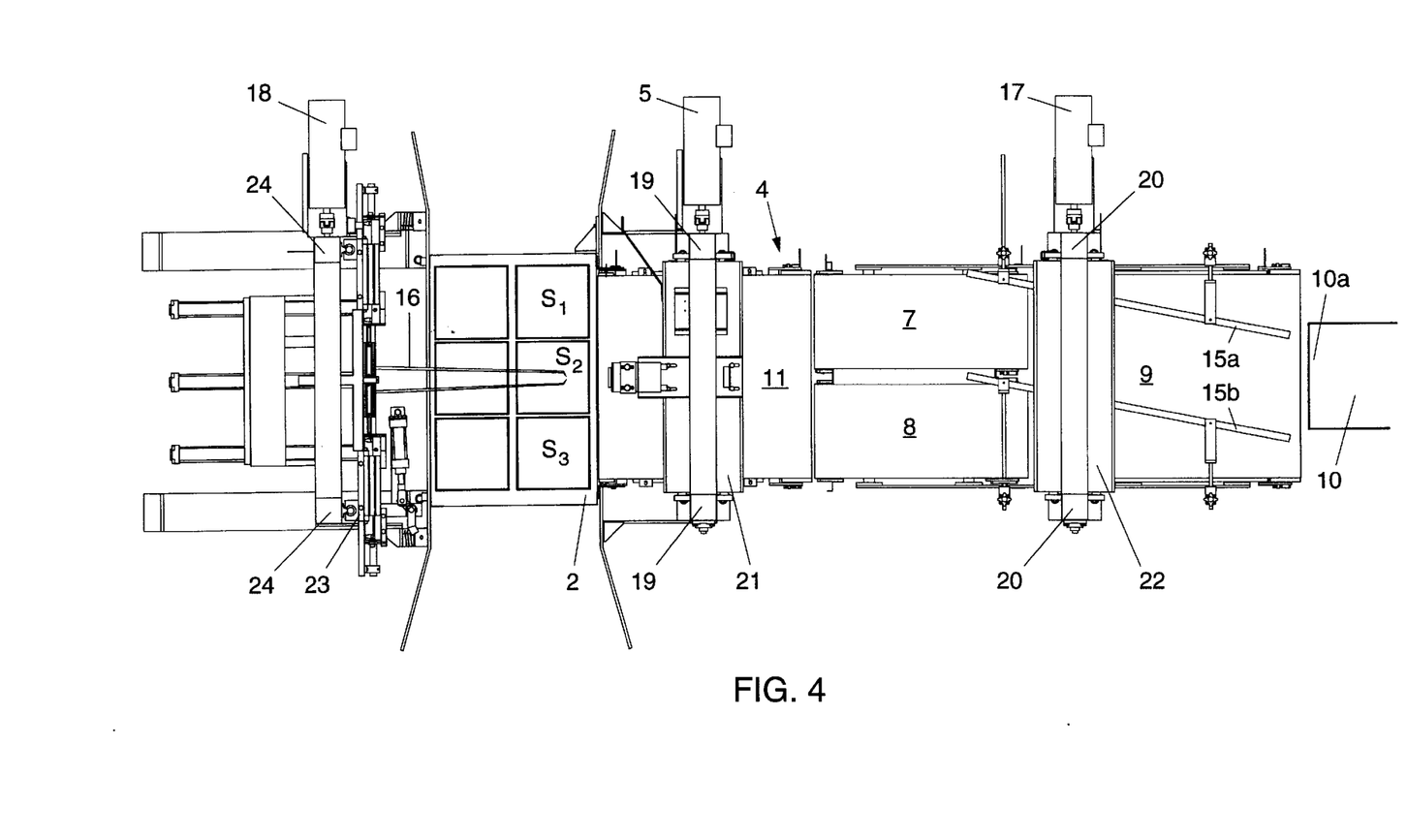
FIG. 4 is a top plan view of the exemplary embodiment shown in FIG. 3.

The exemplary embodiment shown in FIGS. 3 and 4 is a loading apparatus comprising control means 15, disposed above the conveying surface of the second conveyor 9, for guiding a stack of packages S either to one or to the other first conveyor 7 or 8 respectively of the conveyor assembly 7, 8, 9. The control means 15 are designed as pivotally arranged guiding elements 15a, 15b bounding a conveying path which from the second end 9b of the second conveyor 9 in conveying direction, in a first swivel position leads to one first conveyor 7 and in a second swivel position leads to the other first conveyor 8. The apparatus is further characterized by sliding means 16 adapted to move apart in width direction, on a container shelf 2, two juxtaposed rows of stacks S1, S3, viewed in the width direction.

The loading apparatus shown is suitable for loading a container of which each container shelf 2 is suitable for receiving six stacks of packages S, juxtaposed in three rows S1, S2, S3 extending in the conveying direction of the collecting table conveyor 11. The apparatus comprises a control designed so that during the loading of a container shelf the following steps are passed through:

The endless conveyor assembly 7, 8, 9 is first moved to the level of the further conveyor 10 for receiving three rows of packages S1, S2, S3. The control means 15 guide the first row S1 received to one first conveyor 7 and the second row S3 received to the other first conveyor 8. Then, the collecting table conveyor 11 is moved to the level of the conveyor assembly 7, 8, 9 or moves to that level in order to receive the two juxtaposed rows of stacks S1, S3 located on the first conveyors 7, 8. After this, the collecting table conveyor 11 moves to the level of the container shelf 2 and the rows of stacks S1, S3 are placed on the container shelf 2. Simultaneously, the further conveyor 10 can transfer a third row of stacks S2 onto the conveyor assembly 7, 8, 9, whilst the control means 15 are in the neutral position, so that the third row of stacks S2 is advanced straight on in the conveying direction of the further conveyor 10. Then, the collecting table conveyor 11 and the conveyor assembly 7, 8, 9 are brought to the same level for transferring the third row of stacks S2 onto the collecting table conveyor 11. At the same time, the sliding means 16 move apart the two rows of stacks S1, S3 located on the container shelf 2 so as to create a space between the two rows of stacks S1, S3, into which space the third row of stacks S2 can be slid. Then, the collecting table conveyor 11 is moved to the level of the container shelf 2 or is still located at that level and the third row of stacks S2 is introduced into the above-mentioned space, while simultaneously, the conveyor assembly 7, 8, 9 receives a next series of rows of stacks S1, S2, S3 for a next container shelf 2.

It is readily understood that the invention is not limited to the exemplary embodiments described, but that various modifications are possible within the framework of the invention.

I claim:

1. An apparatus for loading and unloading a container with stacks of packages, said container having a plurality of shelves which are arranged one above the other and supported by a frame the apparatus comprising:

a collecting table for supporting at least one stack of packages, a moving means for moving the collecting table in a vertical direction to a respective level of a selected shelve of the container, a sliding means for sliding the stacks of packages over the selected shelve (a) during loading from the collecting table and (b) during unloading to the collecting table, said moving means being displaceable in the vertical direction relative to the container, and a transfer means for transferring of the stacks of packages between the collecting table and one end of a further conveyor, wherein the collecting table comprises an endless collecting table conveyor having a first end and a second end, wherein the transfer means comprises an endless conveyor assembly which is displaceable in the vertical direction independently of the collecting table, wherein a first end of the endless conveyor assembly is connectable, through a vertical displacement of the endless conveyor assembly relative to the collecting table conveyor, to the second end of the collecting table conveyor, and wherein a second end of the endless conveyor assembly is connectable, through a vertical displacement of the endless conveyor assembly, to the one end of the further conveyor wherein the collecting table conveyor is adapted to simultaneously receive and dispense at least two juxtaposed stacks of packages, viewed in a width direction of the connecting table conveyor, wherein the endless conveyor assembly comprises (a) two endless first conveyors drivable independently of each other and extending next to each other, respective first ends of the two endless first conveyors being connectable to the second end of the collecting table conveyor and (b) a single endless second conveyor, said second conveyor having a first end to which respective second ends of the endless first conveyors are each connected and having a second end connectable, through vertical displacement of the endless conveyor assembly, to the first end of the further conveyor.

2. An apparatus according to claim 1, and further including a displacing means, disposed above a conveying surface of the second conveyor, for displacing eccentrically fed stacks of packages to a center of the second conveyor.

3. An apparatus according to claim 2, wherein the displacing means is two guiding elements disposed as a funnel, whose mutual separation distance, viewed in a conveying direction from the first end to the second end of the second conveyor, decreases.

4. An apparatus according to claim 3, wherein the separation distance between the guiding elements at the first end of the second conveyor at least corresponds to twice a width of the stacks of packages to be processed, whilst the separation distance at the second end of the second conveyor is larger than the width but smaller than twice the width of the stacks of packages to be processed.

5. An apparatus according to claim 2, wherein each container shelf is suitable for receiving six stacks of packages positioned next to each other in three rows extending in a conveying direction of the collecting table conveyor and wherein the apparatus further comprises a control designed so that during unloading:

the collecting table conveyor moves to the level of the selected container shelf, whereupon the sliding means first slides the central row of the three rows onto the collecting table conveyor, whereupon the sliding means then slides the two outer rows of stacks against each other, substantially at the center of the selected container shelf, whereupon the endless conveyor assembly moves or has already moved to the level of the collecting table conveyor, whereupon the sliding means slides the outer two rows of stacks onto the collecting table conveyor, whilst simultaneously, the row of stacks which is already located on the collecting table conveyor is conveyed onto the endless conveyor assembly, whereupon both the collecting table conveyor and the first and second conveyors of the endless conveyor assembly are driven such that all rows of stacks of packages are located on the endless conveyor assembly, whereupon the collecting table conveyor is moved to a next container shelf to receive a next row of stacks and at the same time, the endless conveyor assembly moves to the level of the further conveyor for successively transferring onto the further conveyor the rows of stacks of packages located on the endless conveyor assembly.

6. An apparatus according to claim 1, and further including a control means, disposed above a conveying surface of the second conveyor, for guiding a stack of packages alternately from said further conveyor to a first one of the first conveyors, a second one of the first conveyors and straight on both the first one and second one of the first conveyors in a conveying direction.

7. An apparatus according to claim 6, wherein the control means includes pivotally arranged guiding elements bounding a conveying path which, when viewed from the second conveyor, in a first swivel position leads to the first one of the first conveyors and in a second swivel position leads to the second one of the first conveyors and which in a neutral position leads straight on.

8. An apparatus according to claim 6, wherein said sliding means is adapted to move apart in a width direction, on the selected container shelf, two juxtaposed rows of stacks delivered by said collecting table.

9. An apparatus according to claim 6, wherein each container shelf is suitable for receiving six stacks of packages, juxtaposed in three rows extending in a conveying direction of the collecting table conveyor, and wherein the apparatus further comprises a control designed so that during loading:

the endless conveyor assembly first moves to the level of the further conveyor for receiving three rows of packages, and the control means guides the first row received to the first one of the first conveyors and the second row received to the second one of the first conveyors, and the collecting table conveyor moves to the level of the conveyor assembly for receiving the two juxtaposed rows of stacks located on the first conveyors of the conveyor assembly, whereupon the collecting table conveyor moves to the level of the selected container shelf and places the rows of stacks on the selected container shelf, whilst the further conveyor transfers a third row of stacks of packages onto the conveyor assembly, and the collecting table conveyor and the conveyor assembly are brought to the same level for transferring the third row of stacks onto the collecting table conveyor, whilst at the same time, the sliding means moves apart the two rows of stacks located on the selected container shelf so as to create a space between the two rows of stacks, into which the third row of stacks can be slid, whereupon the collecting table conveyor moves or has already moved to the level of the selected container shelf and introduces the third row of stacks into said space, whilst simultaneously, the conveyor assembly receives a next series of rows of stacks for a next container shelf.

10. An apparatus according to claim 1, wherein a conveying direction of (a) the endless collecting table conveyor, (b) the first and second endless conveyors of the conveyor assembly and (c) the further conveyor corresponds to a direction wherein the sliding means transfer the stacks of packages between the selected container shelf and collecting table conveyor.

11. An apparatus according to claim 1, wherein a conveying speed of the collecting table conveyor is at least as great as a speed of movement of the sliding means.

12. An apparatus according to claim 1, and further including a lift means for temporarily lifting a side, facing the collecting table, of a container shelf located above the selected container shelf on which the stacks are slid by said sliding means.

13. An apparatus for loading a container with stacks of packages said container having a plurality of shelves which are arranged one above the other and supported by a frame, the apparatus comprising:

a collecting table for supporting at least one stack of packages, a moving means for moving the collecting table in a vertical direction to a respective level of a selected shelve of the container, a sliding means for sliding the stacks of packages over the selected shelve during loading from the collecting table, said moving means being displaceable in the vertical direction relative to the container, and a transfer means for transferring of the stacks of packages between the collecting table and one end of a further conveyor, wherein the collecting table comprises an endless collecting table conveyor having a first end and a second end, wherein the transfer means comprises an endless conveyor assembly which is displaceable in the vertical direction independently of the collecting table, wherein a first end of the endless conveyor assembly is connectable, through a vertical displacement of the endless conveyor assembly relative to the collecting table conveyor, to the second end of the collecting table conveyor, and wherein a second end of the endless conveyor assembly is connectable, through a vertical displacement of the endless conveyor assembly, to the one end of the further conveyor wherein the collecting table conveyor is adapted to simultaneously receive at least two juxtaposed stacks of packages, viewed in a width direction of the connecting table conveyor, wherein the endless conveyor assembly comprises (a) two endless first conveyors drivable independently of each other and extending next to each other, respective first ends of the two endless first conveyors being connectable to the second end of the collecting table conveyor and (b) a single endless second conveyor, said second conveyor having a first end to which respective second ends of the endless first conveyors are each connected and having a second end connectable, through vertical displacement of the endless conveyor assembly, to the first end of the further conveyor.

14. An apparatus according to claim 13, and further including a control means, disposed above a conveying surface of the second conveyor, for guiding a stack of packages alternately from said further conveyor to a first one of the first conveyors, a second one of the first conveyors and straight on both the first one and second one of the first conveyors in a conveying direction.

15. An apparatus according to claim 14, wherein the control means includes pivotally arranged guiding elements bounding a conveying path which, when viewed from the second conveyor, in a first swivel position leads to the first one of the first conveyors and in a second swivel position leads to the second one of the first conveyor, and which in a neutral position leads straight on.

16. An apparatus according to claim 14, wherein said sliding means is adapted to move apart in a width direction, on the selected container shelf, two juxtaposed rows of stacks delivered by said collecting table.

17. An apparatus according to claim 14, wherein each container shelf is suitable for receiving six stacks of packages, juxtaposed in three rows extending in a conveying direction of the collecting table conveyor, and wherein the apparatus further comprises a control designed so that during loading:

the endless conveyor assembly first moves to the level of the further conveyor for receiving three rows of packages, and the control means guides the first row received to the first one of the first conveyors and the second row received to the second one of the first conveyors, and the collecting table conveyor moves to the level of the conveyor assembly for receiving the two juxtaposed rows of stacks located on the first conveyors of the conveyor assembly, whereupon the collecting table conveyor moves to the level of the selected container shelf and places the rows of stacks on the selected container shelf, whilst the further conveyor transfers a third row of stacks of packages onto the conveyor assembly, and the collecting table conveyor and the conveyor assembly are brought to the same level for transferring the third row of stacks onto the collecting table conveyor, whilst at the same time, the sliding means moves apart the two rows of stacks located on the selected container shelf so as to create a space between the two rows of stacks, into which the third row of stacks can be slid, whereupon the collecting table conveyor moves or has already moved to the level of the selected container shelf and introduces the third row of stacks into said space, whilst simultaneously, the conveyor assembly receives a next series of rows of stacks for a next container shelf.

18. An apparatus according to claim 13, wherein a conveying direction of (a) the endless collecting table conveyor, (b) the first and second endless conveyors of the conveyor assembly and (c) the further conveyor corresponds to a direction wherein the sliding means transfer the stacks of packages from the collecting table conveyor to the selected container shelf.

19. An apparatus according to claim 13, and further including a lift means for temporarily lifting a side, facing the collecting table, of a container shelf located above the selected container shelf on which the stacks are slid by said sliding means.

20. An apparatus for unloading a container with stacks of packages, said container having a plurality of shelves which are arranged one above the other and supported by a frame, the apparatus comprising:

a collecting table for supporting at least one stack of packages, a moving means for moving the collecting table in a vertical direction to a respective level of a selected shelve of the container, a sliding means for sliding the stacks of packages over the selected shelve during unloading to the collecting table, said moving means being displaceable in the vertical direction relative to the container, and a transfer means for transferring of the stacks of packages between the collecting table and one end of a further conveyor, wherein the collecting table comprises an endless collecting table conveyor having a first end and a second end, wherein the transfer means comprises an endless conveyor assembly which is displaceable in the vertical direction independently of the collecting table, wherein a first end of the endless conveyor assembly is connectable, through a vertical displacement of the endless conveyor assembly relative to the collecting table conveyor, to the second end of the collecting table conveyor, and wherein a second end of the endless conveyor assembly is connectable, through a vertical displacement of the endless conveyor assembly, to the one end of the further conveyor wherein the collecting table conveyor is adapted to simultaneously dispense at least two juxtaposed stacks of packages, viewed in a width direction of the connecting table conveyor, wherein the endless conveyor assembly comprises (a) two endless first conveyors drivable independently of each other and extending next to each other, respective first ends of the two endless first conveyors being connectable to the second end of the collecting table conveyor and (b) a single endless second conveyor, said second conveyor having a first end to which respective second ends of the endless first conveyors are each connected and having a second end connectable, through vertical displacement of the endless conveyor assembly, to the first end of the further conveyor.

21. An apparatus according to claim 20, and further including a displacing means, disposed above a conveying surface of the second conveyor, for displacing eccentrically fed stacks of packages to a center of the second conveyor.

22. An apparatus according to claim 21, wherein the displacing means is two guiding elements disposed as a funnel, whose mutual separation distance, viewed in a conveying direction from the first end to the second end of the second conveyor, decreases.

23. An apparatus according to claim 22, wherein the separation distance between the guiding elements at the first end of the second conveyor at least corresponds to twice a width of the stacks of packages to be processed, whilst the separation distance at the second end of the second conveyor is larger than the width but smaller than twice the width of the stacks of packages to be processed.

24. An apparatus according to claim 21, wherein each container shelf is suitable for receiving six stacks of packages positioned next to each other in three rows extending in a conveying direction of the collecting table conveyor, and wherein the apparatus further comprises a control designed so that during unloading:

the collecting table conveyor moves to the level of the selected container shelf, whereupon the sliding means first slides the central row of the three rows onto the collecting table conveyor, whereupon the sliding means then slides the two outer rows of stacks against each other, substantially at the center of the selected container shelf, whereupon the endless conveyor assembly moves or has already moved to the level of the collecting table conveyor, whereupon the sliding means slides the outer two rows of stacks onto the collecting table conveyor, whilst simultaneously, the row of stacks which is already located on the collecting table conveyor is conveyed onto the endless conveyor assembly, whereupon both the collecting table conveyor and the first and second conveyors of the endless conveyor assembly are driven such that all rows of stacks of packages are located on the endless conveyor assembly, whereupon the collecting table conveyor is moved to a next container shelf to receive a next row of stacks and at the same time, the endless conveyor assembly moves to the level of the further conveyor for successively transferring onto the further conveyor the rows of stacks of packages located on the endless conveyor assembly.

25. An apparatus according to claim 20, wherein a conveying direction of (a) the endless collecting table conveyor, (b) the first and second endless conveyors of the conveyor assembly and (c) the further conveyor corresponds to a direction wherein the sliding means transfer the stacks of packages from the selected container shelf to the collecting table conveyor.

26. An apparatus according to claim 20, wherein a conveying speed of the collecting table conveyor is at least as great as a speed of movement of the sliding means.

27. An apparatus according to claim 20, and further including a lift means for temporarily lifting a side, facing the collecting table, of a container shelf located above the selected container shelf on which the stacks are slid by said sliding means.

* * * * *